(12) United States Patent
Oestreich et al.

(10) Patent No.: US 9,556,345 B2
(45) Date of Patent: Jan. 31, 2017

(54) DEFOAMING WETTING AGENTS FOR AQUEOUS COATING SYSTEMS

(75) Inventors: Sascha Oestreich, Düsseldorf (DE); Renate Wolf, Bocholt (DE); Peter Bene, Köln (DE)

(73) Assignee: Cognis IP Management GmbH, Düsseldorf (DE)

( * ) Notice: Subject to any disclaimer, the term of this patent is extended or adjusted under 35 U.S.C. 154(b) by 514 days.

(21) Appl. No.: 13/821,129

(22) PCT Filed: May 26, 2011

(86) PCT No.: PCT/EP2011/002599
§ 371 (c)(1),
(2), (4) Date: Mar. 6, 2013

(87) PCT Pub. No.: WO2012/031641
PCT Pub. Date: Mar. 15, 2012

(65) Prior Publication Data
US 2013/0160676 A1  Jun. 27, 2013

(30) Foreign Application Priority Data
Sep. 7, 2010  (EP) ..................... 10175634

(51) Int. Cl.
| | | |
|---|---|---|
| C09D 7/12 | (2006.01) |
| B01D 19/04 | (2006.01) |
| B01F 17/00 | (2006.01) |
| C09B 67/20 | (2006.01) |
| C09D 5/02 | (2006.01) |
| C09D 7/02 | (2006.01) |

(52) U.S. Cl.
CPC ......... *C09D 7/1233* (2013.01); *B01D 19/0404* (2013.01); *B01F 17/0021* (2013.01); *C09B 67/0066* (2013.01); *C09D 5/027* (2013.01); *C09D 7/02* (2013.01)

(58) Field of Classification Search
CPC ............. B01D 19/0404; B01F 17/0021; C09B 67/0066; C09D 5/027; C09D 7/02; C09D 7/1233

See application file for complete search history.

(56) References Cited

U.S. PATENT DOCUMENTS

| | | | |
|---|---|---|---|
| 4,092,266 A | 5/1978 | Abel et al. | |
| 5,705,476 A | 1/1998 | Hoffarth | |
| 6,057,375 A | 5/2000 | Wollenweber et al. | |
| 6,822,044 B1 * | 11/2004 | Bremser | 525/64 |
| 2006/0052648 A1 | 3/2006 | Wulff | |

FOREIGN PATENT DOCUMENTS

| | | |
|---|---|---|
| DE | 10243362 | 4/2004 |
| EP | 0681865 | 4/1995 |
| WO | WO-2009/061452 | 5/2009 |

OTHER PUBLICATIONS

"International Search Report of PCT/EP2011/002599", mailed on Aug. 24, 2011, 3 pages.

* cited by examiner

*Primary Examiner* — Robert Jones, Jr.
(74) *Attorney, Agent, or Firm* — Marshall, Gerstein & Borun LLP

(57) ABSTRACT

The disclosure relates to the use of compounds of specific structure as defoaming wetting agents for aqueous coating systems, for example paints and varnishes. The disclosure is more particularly related to methods of reducing the surface tension and/or increasing the density of an aqueous coating system, which methods include adding alcohol propoxylates to an aqueous coating system. The alcohol propoxylates have the general structure $R—O—(PO)_xH$, in which R is a saturated alkyl radical having 7 to 10 C atoms, PO is a propylene oxide unit, and x is a number in the range from 4 to 6. The resulting aqueous coating composition has good wetting properties, but is low in foam, so it does not disrupt processing operations of the coating system.

14 Claims, No Drawings

DEFOAMING WETTING AGENTS FOR AQUEOUS COATING SYSTEMS

CROSS-REFERENCE TO RELATED APPLICATIONS

This application is the national stage entry of PCT/EP2011/002599, filed on May 26, 2011, which claims priority to European Patent application number 10175634.4, filed on Sep. 7, 2010, both of which are incorporated herein by reference in their entireties.

FIELD

The invention relates to the use of compounds of specific structure as defoaming wetting agents for aqueous coating systems, more particularly paints and varnishes.

BACKGROUND

Substrate wetting agents are interface-active compounds which lower the surface tension especially of aqueous varnish and paint formulations in order thus to promote for example the substrate wetting and also the flow. Substrate wetting agents are especially important for avoiding defects in the coating film when the substrate has a low surface tension (such as polymeric films, for example) or is contaminated with oily substances.

Substrate wetting agents are available in liquid and solid forms and often the commercially available products constitute mixtures of different interface-active compounds. It is considered common general knowledge here that such interface-active compounds have amphiphilic character—that is, they are generally composed of molecules with a hydrophilic and a hydrophobic moiety. Typical hydrophilic building blocks of these amphiphiles are anionic groups or ethylene oxide units. Nowadays use is often made of what are called alkylphenol ethoxylates—which increasingly, however, are preferably avoided on environmental protection grounds. Established alternatives to the alkylphenol ethoxylates include the alcohol ethoxylates, i.e., adducts of ethylene oxide with (hydrophobic) alcohols. A disadvantage of the alkylphenol ethoxylates and also of many alcohol ethoxylates is the frequently foam-stabilizing effect of these substrate wetting agents. The foam which forms during the production and processing of paints and varnishes disrupts the processing operations and interferes with handling, and is therefore suppressed—at cost and inconvenience—using foam-destroying additives.

In order to counter the problem of foam stabilization, a variety of products have been developed in the past. Alcohol alkoxylates are often used, for example, as low-foam wetting agents. Typical commercially available alcohol alkoxylates consist in general of linear or branched alcohols which have been reacted with ethylene oxide (EO) and optionally, additionally, with propylene oxide (PO) or else with higher epoxides (e.g., butylene oxide, BuO). As the skilled person is aware, the purpose of EO units is to construct the hydrophilic moiety of the molecule, while the alkyl radicals (originating from the alcohol building block) and also the PO units form the hydrophobic moiety of the molecule.

Also known (see WO-A-2009/061452 and EP-A-681,865) is the formulation of alcohol propoxylates in combination with other surfactants and the use of such formulations as low-foam cleaners.

SUMMARY

One aspect of the invention relates to a method of reducing the surface tension of an aqueous coating system, the method comprising adding a of compound of the structure (I)

$$R\text{—}O\text{—}(PO)_xH \qquad (I)$$

in which R is an alkyl radical having 6 to 12 C atoms, which may be saturated or unsaturated, straight-chain or branched, PO is a propylene oxide unit, and x is a number in the range from 1 to 7, to an aqueous coating system. Another aspect of the invention relates to a method of increasing the density of an aqueous coating system, the method comprising adding a of compound of the structure (I)

$$R\text{—}O\text{—}(PO)_xH \qquad (I)$$

in which R is an alkyl radical having 6 to 12 C atoms, which may be saturated or unsaturated, straight-chain or branched, PO is a propylene oxide unit, and x is a number in the range from 1 to 7, to an aqueous coating system.

DETAILED DESCRIPTION

A continual need exists for compounds for specific use in aqueous coating systems, more particularly paints and varnishes, especially transparent varnishes (clearcoats), which on the one hand have good wetting agent properties and on the other hand are low in foam, and so do not disrupt the processing operations during processing of the coating systems, without the need for additional foam-destroying additives to be added.

The object of the present invention was to provide defoaming wetting agents for aqueous coating systems, more particularly paints and varnishes, especially transparent varnishes (clearcoats), which meet these requirements—that is, on the one hand, have good wetting agent properties (lowering of the surface tension in aqueous systems) and, on the other hand, are defoaming, and so do not cause foam disruption of the processing operations during the processing of aqueous coating systems, more particularly paints and varnishes. As a consequence it is, ideally, unnecessary to add any additional foam-destroying additives, or the amount thereof can be reduced.

Aqueous coating systems for the purposes of the present invention are aqueous paint and varnish formulas and also aqueous adhesive formulas. These systems customarily comprise water, binders and emulsifiers/dispersants, and also further, customary ingredients, such as pigments or fillers, and further additives (including, for example, solvents, coalescents, plasticizers, defoamers, dispersants, wetting agents, etc.). Binders are typically aqueous polymer dispersions. Such polymer dispersions may be prepared by various polymerization processes (e.g., emulsion polymerization, suspension polymerization), directly from the monomers or else by dispersing of a polymer. For the preparation and stabilization of the polymer dispersions it is usual to use emulsifiers and dispersants. These are, typically, anionic or nonionic surfactants, the nonionic surfactants usually containing EO building blocks. Compounds of the structure (I) defined below are excluded as emulsifiers/dispersants. Examples of aqueous coating systems in the sense of this invention are pigmented and unpigmented aqueous paint and varnish formulations and adhesives, more particularly wall paints, masonry paints, primers, printing inks, overprint varnishes, printing inks for cardboard packaging, wallpaper inks, paper coating slips, industrial varnishes, industrial coatings, leather lacquers, woodstains, wood varnishes, mordants, bates, dressing, pickles, automotive paints, coatings for plastics, coatings for flooring, marine paints, anticorrosion coatings, and adhesives.

It may be stated explicitly that the object of the invention is directed to the simultaneous attainment of the stated technical effects in aqueous coating systems, more particularly in aqueous paints and varnishes, especially transparent varnishes (clearcoats), and not, for instance, to other aqueous systems or to water alone.

It has now been found that specific alcohol propoxylates of the structure (I) defined below are able to achieve the object of the invention in an outstanding way.

The present invention provides the use of compounds of the structure (I)

$$R\text{—}O\text{—}(PO)_xH \qquad (I)$$

in which R is an alkyl radical having 6 to 12 C atoms, which may be saturated or unsaturated, straight-chain or branched, PO is a propylene oxide unit, and x is a number in the range from 1 to 7, as defoaming wetting agents for aqueous coating systems.

Preferred aqueous coating systems are aqueous paints and varnishes. Transparent varnishes (clearcoats) are especially preferred aqueous coating systems.

The compounds (I) may be prepared by all of the methods known to the skilled person. Their preparation is typically accomplished by reacting the corresponding alcohols with propylene oxide in the presence of a catalyst. With regard to the index x, it may be noted in this context that this index is a (statistical) average value, and so for R—O—(PO)$_x$H the statement x=1 means that 1 mol of ROH has been reacted with 1 mol of propylene oxide; x=2 means that 1 mol of ROH has been reacted with 2 mol of propylene oxide; x=4 denotes that 1 mol of ROH has been reacted with 4 mol of propylene oxide; x=6 denotes that 1 mol of ROH has been reacted with 6 mol of propylene oxide, and so on. The index x therefore represents the molar reaction ratio of alcohol and propylene oxide, and the alcohol propoxylates (I) may differ in their homolog distribution depending on the catalyst employed.

The term "defoaming wetting agents" is defined for the purposes of the present invention as follows: Relative to a sample without defoaming wetting agent, the defoaming wetting agents reduce the surface tension in the surface tension determination described below (test 1) by at least 5%—preferably by at least 10%—and, relative to a sample without defoaming wetting agent, in the foam test described below (test 2) they increase the density by at least 5%, preferably by at least 10%.

The surface tension determination (test 1) is carried out as follows:

(1) The commercially available binder dispersion NeoPac E-106 from DSM NeoResins is diluted in a weight ratio of 4:1 with demineralized water. The resulting mixture is termed test system (1).

(2) As a reference value, the surface tension of test system (1) is then determined. The surface tension is ascertained using a bubble pressure tensiometer from SITA science line t60 (measuring range 10-100 mN/m; measurement deviation max. 1% f.s.; reproducibility 0.5 mN/m; bubble frequency 0.01-10 Hz; temperature 22° C.) The surface tension is reported at a frequency of 1 Hz.

(3) 0.5 wt. %—based on the amount of test system (1)—of the defoaming wetting agent under test is metered into test system (1) and carefully incorporated by stirring. The surface tension of the resultant mixture is determined as indicated under (2).

The foam test (test 2) is carried out as follows:

(1) The commercially available binder dispersion NeoPac E-106 from DSM NeoResins is diluted in a weight ratio of 4:1 with demineralized water. The resulting mixture is termed test system (2).

(2) As a reference value, the foam test is carried out first of all on test system (2). For this purpose test system (2) is stirred for 3 minutes at 5000 rpm using a laboratory dissolver (dissolver disk diameter: 4 cm). The density of the agitated test system (2) is then determined using the coatings pyknometer.

(3) 0.5 wt. %—based on the amount of test system (2)—of the defoaming wetting agent under test is metered into test system (2) and carefully incorporated by stirring. The mixture is then likewise stirred for 3 minutes at 5000 rpm using a laboratory dissolver (dissolver disk diameter: 4 cm). The density of the resultant mixture is determined as indicated under (2).

In one preferred embodiment, R is a saturated alkyl radical having 7 to 10 C atoms and x is a number in the range from 4 to 6. Compounds (I) in which R is a saturated alkyl radical having 8 C atoms and x is the number 6 are particularly preferred. Especially preferred are adducts of 6 mol of PO with 1 mol of n-octanol, particularly for use in transparent varnishes (clearcoats).

In the present context it may be stated explicitly that to the skilled person it is completely surprising that the compounds (I) achieve the object of the invention.

The object is indeed, as set out above, that of achieving two inherently contradictory effects—namely, on the one hand, a good wetting effect in conjunction with defoaming, and both in quite specific aqueous systems, namely aqueous coating systems, more particularly paints and varnishes. The fact that it is specific alcohol propoxylates that achieve both technical effects must be considered, from the standpoint of the skilled person, to constitute the overcoming of an existing technical prejudice, since—as stated in the introduction above—it is the case—according to general understanding—that wetting agents are typically, structurally, amphiphiles, thus comprising hydrophobic and hydrophilic structural elements. But the compounds (I) for use in accordance with the invention are hydrophobic compounds, since not only the alkyl radicals R but also the PO building blocks are considered hydrophobic; since they are hydrophobic, they are insoluble in pure water.

Mention may also be made of the fact that, for example, hydrophobic compounds such as mineral oils are known to be defoamers, but on the one hand they are not good wetting agents and on the other hand they lead to defects in coating films (they give rise, for example, to hazing in transparent varnishes (clearcoats)). It is all the more surprising to the skilled person that in aqueous coating systems, more particularly aqueous varnishes and paints, the hydrophobic compounds (I) provide good wetting, have a defoaming effect, and at the same time do not negatively impact the application-related processes in the aqueous coating systems, more particularly varnishes and paints.

The compounds (I) are liquid within a wide temperature range at room temperature (20° C.) and are therefore easy to handle and meter. The fact that the alkyl radical R in the compounds (I) derives, in preferred embodiments, from linear alcohols (fatty alcohols), and hence from renewable raw materials, is a further advantage.

EXAMPLES

Substances Used:

All wetting agents were prepared by addition reaction of ethylene oxide and/or propylene oxide with alcohols. The meaning of the designations is as follows:

C10-3EO: Adduct of 3 mol of ethylene oxide with 1 mol of n-decanol.

i-C8-3EO: Adduct of 3 mol of ethylene oxide with 1 mol of 2-ethylhexanol.

i-C8-3PO-b-3EO: Adduct of 3 mol of propylene oxide and 3 mol of ethylene oxide with 1 mol of 2-ethylhexanol. PO and EO here were added on in blocks, with the alcohol being reacted first with PO and the resultant propoxylate subsequently with EO.

i-C9-3PO-b-3EO: Adduct of 3 mol of propylene oxide and 3 mol of ethylene oxide with 1 mol of isononanol. PO and EO here were added on in blocks, with the alcohol being reacted first with PO and the resultant propoxylate subsequently with EO.

C8-5PO-b-1EO: Adduct of 5 mol of propylene oxide and 3 mol of ethylene oxide with 1 mol of n-octanol. PO and EO here were added on in blocks, with the alcohol being reacted first with PO and the resultant propoxylate subsequently with EO.

C8-6PO: Adduct of 6 mol of propylene oxide with 1 mol of n-octanol.

C8-5PO: Adduct of 5 mol of propylene oxide with 1 mol of n-octanol.

C8-4PO: Adduct of 4 mol of propylene oxide with 1 mol of n-octanol.

C8-6PO: Adduct of 6 mol of propylene oxide with 1 mol of n-octanol.

These compounds are set out once again in tables 1 and 2 below, and are classed as inventive or noninventive (for comparison).

TABLE 1

Noninventive alkoxylated wetting agent structures

| Compound | Structure |
| --- | --- |
| V1 | C10-3EO |
| V2 | i-C8-3EO |
| V3 | i-C8-3PO-b-3EO |
| V4 | i-C9-3PO-b-3EO |
| V5 | i-C9-3EO-b-3PO |
| V6 | C8-5PO-b-1EO |

TABLE 2

Inventive defoaming wetting agent structures

| Compound | Structure |
| --- | --- |
| V7 | C8-6PO |
| V8 | C8-5PO |
| V9 | C8-4PO |

Methods of Investigation:

The surface tension was determined in accordance with test 1 described above. The foam test took place in accordance with test 2 described above.

The test results can be found in tables 3 and 4 below.

TABLE 3

Surface tensions according to test (1)

| No. | Structure | Surface tension at 1 Hz (mN/m) | Reduction in surface tension relative to reference (%) |
| --- | --- | --- | --- |
| Reference | | 56.7 | 0 |
| V1 | C10-3EO | 41.8 | −26 |
| V2 | i-C8-3EO | 44.2 | −22 |
| V3 | i-C8-3PO-b-3EO | 42.4 | −25 |
| V4 | i-C9-3PO-b-3EO | 42.4 | −25 |
| V5 | i-C9-3EO-b-3PO | 42.3 | −25 |
| V6 | C8-5PO-b-1EO | 42.1 | −26 |
| V7 | C8-6PO | 42.2 | −26 |
| V8 | C8-5PO | 43.7 | −23 |
| V9 | C8-4PO | 44.4 | −22 |

TABLE 4

Densities according to test (2)

| No. | Structure | Density (g/mL) | Increase in density relative to reference (%) |
| --- | --- | --- | --- |
| Reference | / | 0.497 | 0 |
| V1 | C10-3EO | 0.39 | −22 |
| V2 | i-C8-3EO | 0.482 | −3 |
| V3 | i-C8-3PO-b-3EO | 0.435 | −12 |
| V4 | i-C9-3PO-b-3EO | 0.474 | −5 |
| V5 | i-C9-3EO-b-3PO | 0.501 | 1 |
| V6 | C8-5PO-b-1EO | 0.438 | −12 |
| V7 | C8-6PO | 0.861 | 73 |
| V8 | C8-5PO | 0.802 | 61 |
| V9 | C8-4PO | 0.812 | 63 |

From tables 3 and 4 it is evident that the defoaming wetting agents of the invention reduce the surface tension of the binder dispersion (as per test 1) by at least 22% and also raise the densities as per the foam test (test 2) by at least 61%. In contrast, the noninventive wetting agent structures in some cases show a marked reduction in the densities according to the foam test (unwanted foam development) or raise the densities only by a maximum of 1% (and can therefore be classed, at best, as low-foam or foam-neutral, but not as defoaming).

The invention claimed is:

1. A method of reducing the surface tension of an aqueous coating system, the method comprising adding a compound of the structure (I)

$$R\text{—}O\text{—}(PO)_xH \qquad (I)$$

in which R is a saturated alkyl radical having 7 to 10 C atoms, PO is a propylene oxide unit, and x is a number in the range from 4 to 6, to an aqueous coating system.

2. The method of claim 1, wherein the aqueous coating system comprises a paint or varnish.

3. The method of claim 2, wherein the aqueous coating system comprises a transparent varnish.

4. The method of claim 1, wherein R is a saturated alkyl radical having 8 C atoms and x is the number 6.

5. The method of claim 1, wherein (I) is an adduct of 6 mol of PO with 1 mol of n-octanol.

6. The method of claim 1, wherein the surface tension is decreased by at least 5%.

7. A method of increasing the density of an aqueous coating system, the method comprising adding a compound of the structure (I)

$$R\text{—}O\text{—}(PO)_xH \qquad (I)$$

in which R is a saturated alkyl radical having 7 to 10 C atoms, PO is a propylene oxide unit, and x is a number in the range from 4 to 6, to an aqueous coating system.

8. The method of claim 7, wherein the aqueous coating system comprises a paint or varnish.

9. The method of claim 7, wherein the aqueous coating system comprises a transparent varnish.

10. The method of claim 7, wherein R is a saturated alkyl radical having 8 C atoms and x is the number 6.

11. The method of claim 7, wherein (I) is an adduct of 6 mol of PO with 1 mol of n-octanol.

12. The method of claim 7, wherein the density is increased by at least 5%.

13. The method of claim 7, wherein the density is increased by at least 5%, and the surface tension is decreased by at least 5%.

14. The method of claim 7, wherein the density is increased by an amount in a range from 5% to 73%, and the surface tension is decreased by an amount in a range from 5% to 26%.

* * * * *